United States Patent
Chen et al.

(10) Patent No.: US 11,308,981 B2
(45) Date of Patent: Apr. 19, 2022

(54) MICROWAVE ASSISTED MAGNETIC RECORDING HEAD SLIDER AND LAPPING METHOD THEREOF

(71) Applicant: SAE Magnetics (H.K.) Ltd., Hong Kong (CN)

(72) Inventors: Shi Xiong Chen, Hong Kong (CN); Bin Qi, Hong Kong (CN); Wen Rong Guo, Hong Kong (CN); Peng Liu, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 17/341,553

(22) Filed: Jun. 8, 2021

(65) Prior Publication Data

US 2022/0005496 A1     Jan. 6, 2022

(30) Foreign Application Priority Data

Jul. 3, 2020 (CN) .......................... 202010630434.5

(51) Int. Cl.
    *G11B 5/31*      (2006.01)
    *B24B 49/00*      (2012.01)
    *G11B 5/255*      (2006.01)
    *G11B 5/00*      (2006.01)

(52) U.S. Cl.
CPC ...... *G11B 5/255* (2013.01); *G11B 2005/0024* (2013.01)

(58) Field of Classification Search
CPC ..... G11B 5/3146; G11B 5/1278; G11B 5/235; G11B 5/314; G11B 5/11; G11B 5/193; G11B 5/484; G11B 5/127; G11B 5/33; B24B 27/048; B24B 49/00; B24B 49/04; G01R 33/091; G01R 33/093
USPC ....... 360/59, 324, 125.33, 317, 122, 324.12, 360/324.2, 321; 428/827
See application file for complete search history.

(56) References Cited

U.S. PATENT DOCUMENTS 8,070,554 B2 * 12/2011 Fontana, Jr. ......... G11B 5/3166
                                                                451/8

* cited by examiner

*Primary Examiner* — Nabil Z Hindi
(74) *Attorney, Agent, or Firm* — Nixon & Vanderhye, P.C.

(57) ABSTRACT

A lapping method of a MAMR head slider includes a first lapping process: controlling the lapping plate to spin at a first speed, and controlling the MAMR head slider to move at a first moving speed, and applying a first force to the MAMR head slider; and a second lapping process: controlling the lapping plate to spin at a second speed that is lower than the first speed, and controlling the MAMR head slider to move at a second moving speed that is lower than the first moving speed, and applying a second force that is lower than the first force to the MAMR head slider; and the second lapping process includes a final lapping process section, and the second force in the final lapping process being zero. In such a way, lapping marks on the ABS are reduced to improve the roughness and the reliability.

8 Claims, 9 Drawing Sheets

MICROWAVE ASSISTED MAGNETIC RECORDING HEAD SLIDER AND LAPPING METHOD THEREOF

CROSS REFERENCE TO RELATED APPLICATIONS

This application claims the priority of Chinese Patent Application No. 202010630434.5, filed on Jul. 3, 2020. The content of the above-identified application is incorporated herein by reference.

FIELD OF THE INVENTION

The present invention relates to data storage, and more particularly to a lapping method of a microwave assisted magnetic recording (MAMR) head slider of a hard disk drive.

BACKGROUND OF THE INVENTION

Hard disk drives (HDDs) are common information storage devices. With improvements in recording density of magnetic HDDs, there is an urgent demand for improving the performance of magnetic heads and magnetic recording media. In a magnetic HDD, a magnetic head is embedded in a slider that flies above the surface of a magnetic recording medium to perform data reading and writing operations.

In order to achieve higher recording density of the magnetic head installed in the HDD, it is necessary to narrow the pitch and bit of the write tracks, and the surface area of the main magnetic pole of the air bearing surface is decreased significantly as the recording density increases. As the magnetic pole becomes narrower in the conventional magnetic head, the recording field becomes smaller, moreover the recording density is higher than a certain value, it is no longer possible to achieve the recording field required for writing. To solve this problem, a high-frequency magnetic field assisted recording (Microwave Assisted Magnetic Recording, MAMR) technology has been proposed in which a microwave oscillator (Spin Torque Oscillator, STO) is formed on or near the main magnetic pole, and a high-frequency magnetic field is applied to the recording medium so as to reduce the coercive force of the medium, and the recording field is applied to the medium to record data in this state.

Because of its outstanding advantages, MAMR heads have stricter requirements on the surface quality of the air bearing surface (ABS). Even nano-scale surface scratches will also affect the surface of the medium, the STO and the performance of the pole tip. Furthermore, significant lapping marks (scratches) on the ABS which are often deep cross scratches in the atomic force microscope are caused by the traditional lapping method of the MAMR head slider.

Therefore, there is an urgent need for an improved lapping method of a MAMR head slider to reduce the lapping marks on the ABS and improve the roughness of the pole surface or the ABS, thereby improving the pole tip recession, improving the reliability of the MAMR head and extending the life time of the MAMR head accordingly.

SUMMARY OF THE INVENTION

One objective of the present invention is to provide a lapping method of MAMR head slider, which reduces lapping marks on the ABS, improves the roughness of the surface of magnetic pole or the ABS, thereby improving the pole tip recession, improving the reliability of the MAMR head and extending the life time of the MAMR head accordingly.

Another objective of the present invention is to provide a MAMR head slider, which reduces lapping marks on the ABS, improves the roughness of the surface, thereby improving the reliability and extending the life time.

To achieve above objectives, a lapping method of a microwave assisted magnetic recording (MAMR) head slider, adapted for polishing a predetermined surface of the MAMR head slider by a lapping plate with a lapping surface to form a MAMR head having a spin torque oscillator (STO) on the predetermined surface, includes:

a first lapping process: controlling the lapping plate to spin at a first speed, and controlling the MAMR head slider to move at a first moving speed, and applying a first force to the MAMR head slider so as to polish the predetermined surface; and a second lapping process: controlling the lapping plate to spin at a second speed that is lower than the first speed, and controlling the MAMR head slider to move at a second moving speed that is lower than the first moving speed, and applying a second force that is lower than the first force to the MAMR head slider so as to polish the predetermined surface;

wherein the second lapping process includes a final lapping process section, and the second force in the final lapping process being zero.

As a preferable embodiment, in the second lapping process, the second speed of the lapping plate is in a range of 0.5-0.2 rpm.

Preferably, in the second lapping process except for the final lapping process section, the second force applied to the MAMR head slider is larger than zero and smaller than 0.6 kgf.

Preferably, in the second lapping process, the second moving speed of the MAMR head slider is in a range of 0.8-0.25 mm/s.

Preferably, in the first and second processes, the MAMR head slider is configured to make a reciprocating linear movement along a radial direction of the lapping plate.

Preferably, in the first and second processes, the MAMR head slider is configured to apply the first and the second forces in a direction perpendicular to a surface of the lapping surface.

Preferably, the second lapping process includes multiple sub-lapping process sections and the final lapping process section, the second speed, the second force and the second moving speed in a latter sub-lapping process section is smaller than or equal to that in a previous sub-lapping process section.

Accordingly, a MAMR head slider obtained according to the above method includes a leading edge, a trailing end, an air bearing surface facing a medium, and a MAMR head embedded in the trailing end and having a spin torque oscillator (STO), and the air bearing surface having unidirectional lapping marks.

In comparison with the prior art, the lapping method of the present invention is optimized by using multiple lapping processes, reducing the rotation speed of the lapping plate and the moving speed of the MAMR head slider in the subsequent lapping processes, and removing the pressure on the MAMR head slider in the final lapping process, so as to reduce lapping marks generated on the ABS, improve the roughness of the surface of magnetic pole or the ABS, thereby improving the pole tip recession, improving the reliability of the MAMR head and extending the life time of the MAMR head accordingly.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a lapping method of MAMR head slider, which reduces lapping marks on the ABS, improves the roughness of the surface of magnetic pole or the ABS, thereby improving the pole tip recession, improving the reliability of the MAMR head and extending the life time of the MAMR head accordingly.

Figure 1:
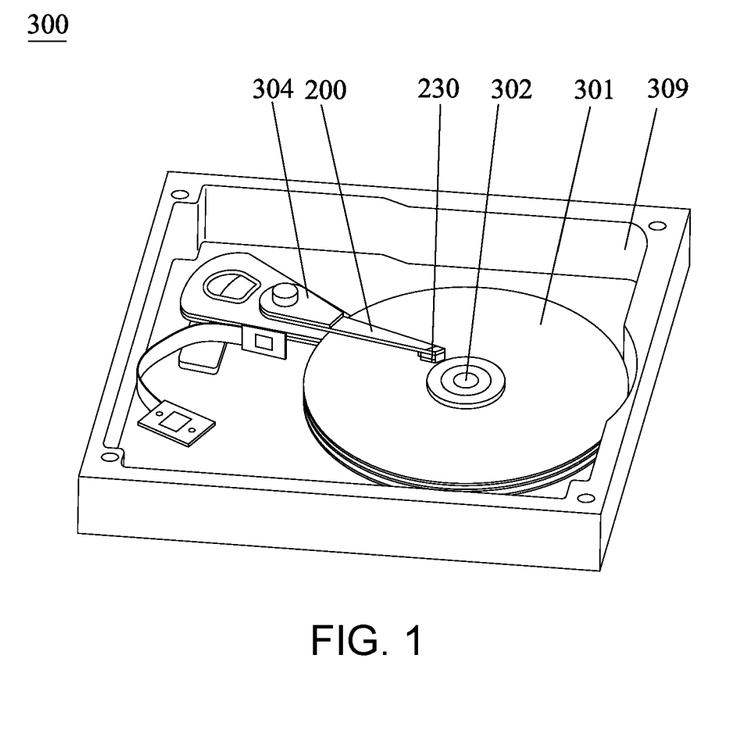
FIG. 1 is a perspective view of an HDD with MAMR heads.

FIG. 1 is a perspective view of an HDD of the present invention. As shown, the HDD 300 includes an HGA 200, drive arms 304 connected with the HGA 200, a number of rotatable magnetic disks 301, a spindle motor 302 for driving the magnetic disks 301, which are mounted in a housing 309. The structure of the HDD 300 of the present invention is not limited however. For example, the number of the magnetic disks 301, the HGA 200 and the drive arm 304 may also be one. Each HGA 200 includes a suspension (not labeled) and a MAMR head slider 230 carried on the suspension for reading or writing data on the magnetic disk 301.

Figure 2:
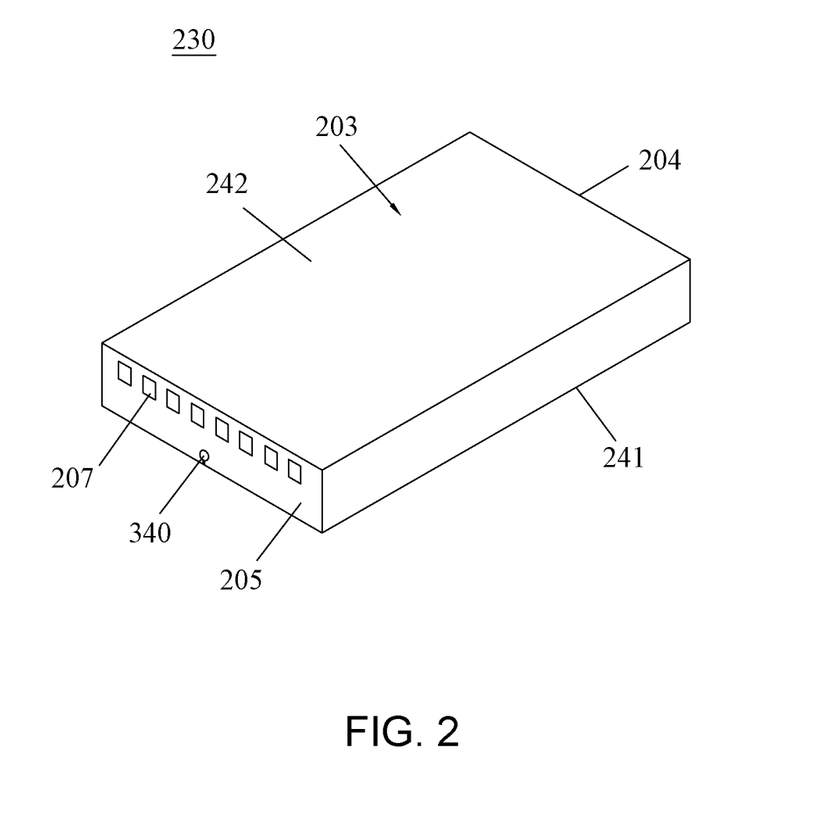
FIG. 2 is a perspective view of the MAMR head slider, which is obtained according to an embodiment of a lapping method of a MAMR head slider of the present invention.

As shown in FIG. 2, the MAMR head slider 230 includes a substrate 203 and a MAMR head 340 embedded in the substrate 203.

Specifically, as shown in FIG. 2, the MAMR head slider 230 includes a leading edge 204, a trailing edge 205, an ABS 241 facing the disk and provided for providing a suitable flying height, and an opposite surface 242 opposite to the ABS 241, and the MAMR head 340 embedded in the trailing edge 205. The reading and writing elements are embedded in the trailing edge 205. The tail 205 has a plurality of connecting pads 207 (for example, 8) for connecting with the suspension of the HGA 200.

Figure 3:
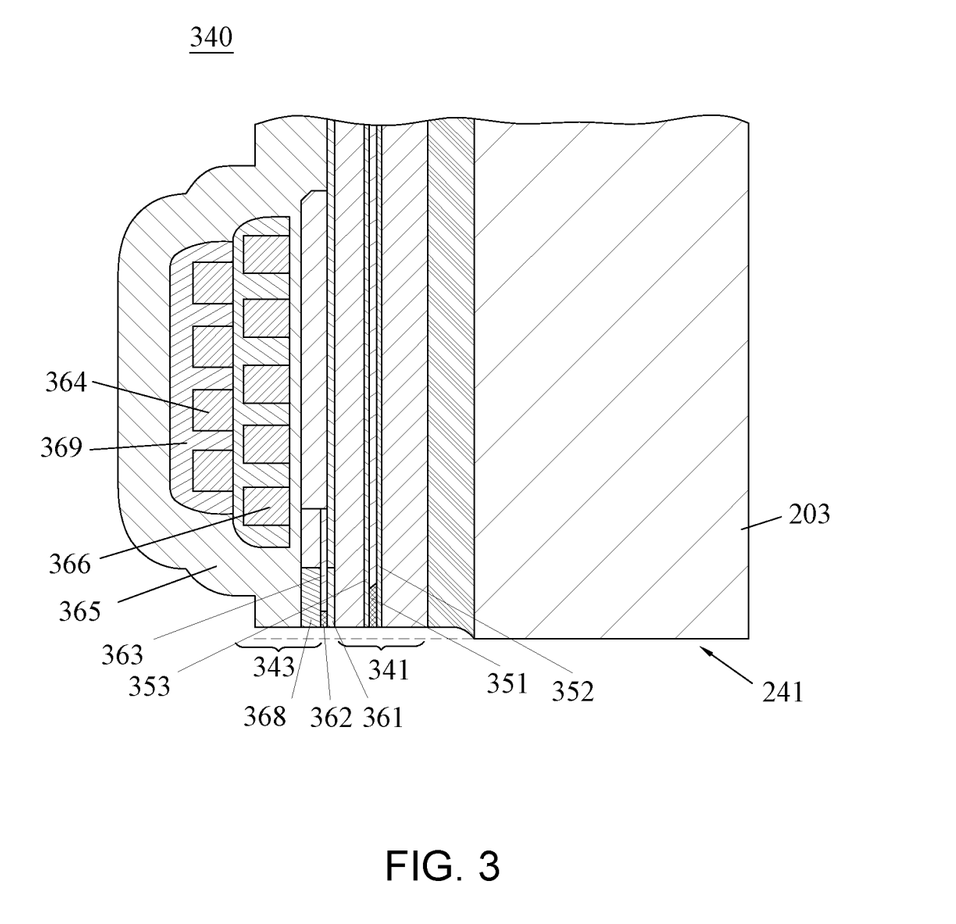
FIG. 3 is a cross-sectional view of the MAMR head slider of FIG. 2.

Specifically, as shown in FIG. 3, the MAMR head slider 230 includes a magnetoresistive (MR) read head 341 formed on the substrate 203 and a write head 343 formed on the MR read head 341. For example, the MR read head 341 can be Current Perpendicular to Plane (CPP) sensor, Current In Plane (CIP) sensor, tunnel magnetoresistive (TMR) sensor, giant magnetoresistive (GMR) sensor, or anisotropic magnetoresistive (AMR) sensor and the like.

The read head 341 includes a magnetic film 351 exhibiting a magnetoresistance effect; and two shielding layers 352 and 353 arranged on the trailing end and the leading end of the magnetic film 351 and sandwiching the magnetic layer 351 therebetween.

Figure 4:
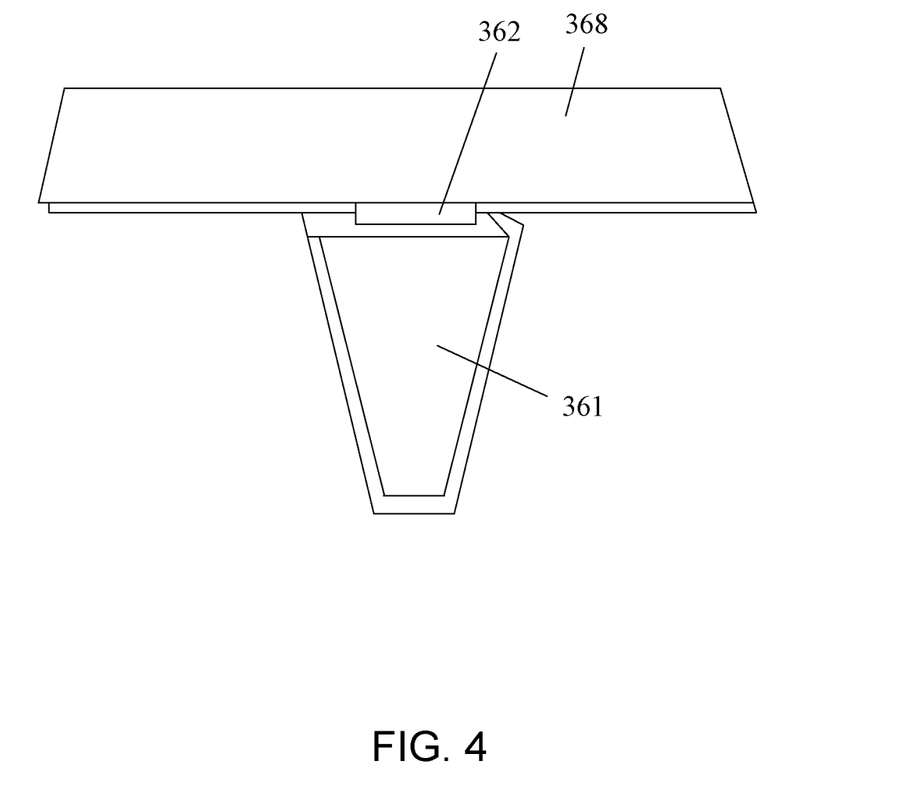
FIG. 4 is a partial schematic diagram of the MAMR head slider, showing the STO and the magnetic pole.

The write head 343 is disposed on the trailing edge 205 of the slider 230 and includes a main magnetic pole 361, a spin torque oscillator (STO) 362, a gap layer 363, a write coil layer 364, a write shielding layer 365 and a coil layer 366. The write coil layer 364 is formed on an insulating layer 369 and passes through at least one loop between the main pole layer 361 and the write shielding layer 365. The STO 362 is configured at the ABS between the front end of the main magnetic pole and a tail shielding layer 368, as shown in FIG. 4, to generate a high-frequency electromagnetic field by exciting a spin wave.

According to the lapping method of the present invention, the lapping marks on the ABS of the MAMR head are reduced, and the directions of the lapping marks are basically unified (unidirectional lapping marks), which greatly improves the stability and life time of the magnetic head. The lapping method of the present invention will be described in detail below.

Figure 5:
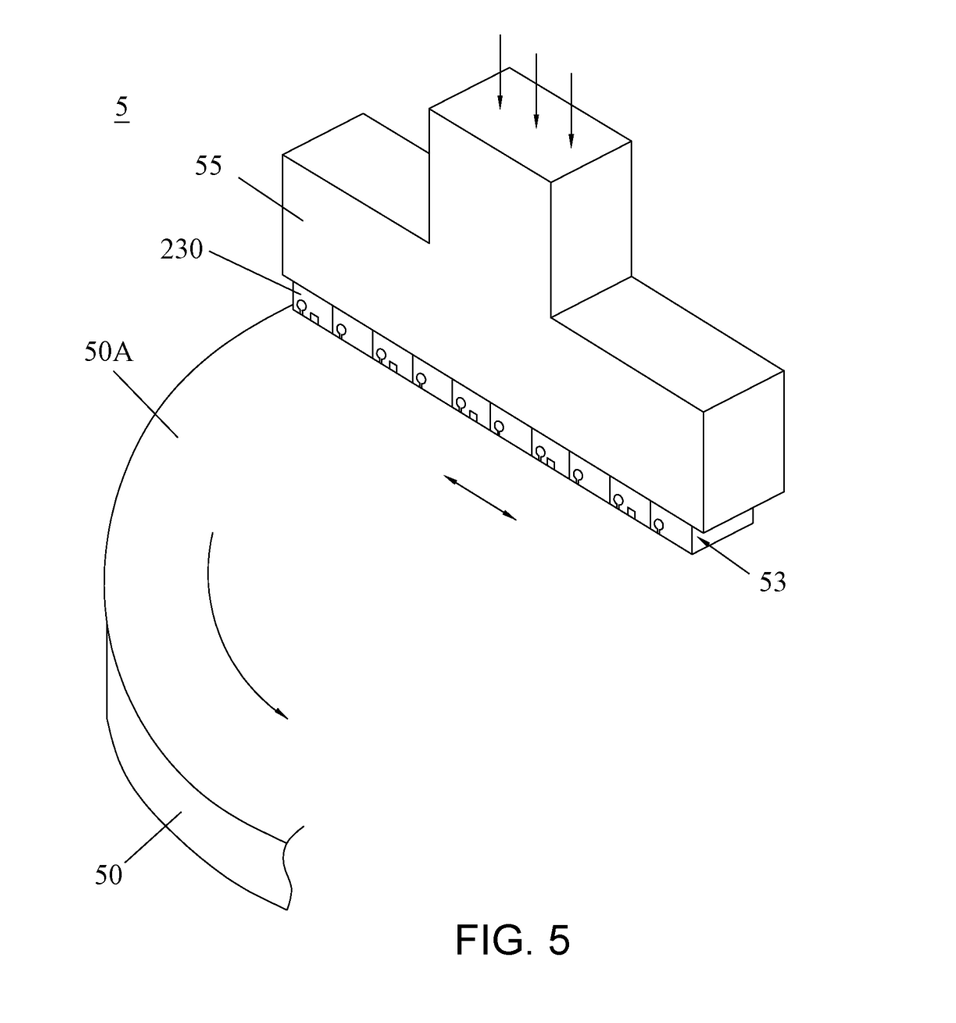
FIG. 5 is a partial schematic diagram of the lapping device used in the lapping method of the MAMR head slider according to the present invention.

FIG. 5 shows a partial schematic diagram of a lapping device 5 used in the lapping method of the MAMR head slider according to the present invention. Specifically, the MAMR head slider 230 is polished in the row bar 53 level (that is, a plurality of MAMR head sliders are arranged together without being divided into independent sliders) to improve the efficiency.

As shown in FIG. 5, the lapping device 5 includes a lapping plate 50 having a lapping surface 50A, a row bar 53 including a series of MAMR head sliders is supported above the lapping plate 50 by a supporting mechanism 55, and the air bearing surface is faced to the lapping surface 50A. The lapping plate 50 composed of diamond abrasives or the like can rotate freely, and the abrasives are embedded on the lapping surface 50A. Lapping liquids or other liquids can also be provided above the lapping surface 50A to supply the polishing surface 50A in operation. The supporting mechanism 55 is connected by the main body (not shown) of the device, and the row bar 53 is located under the supporting mechanism 55 which is controlled to make a reciprocating linear movement along the radial direction of the lapping plate, and to apply a downward pressure to the row bar 53.

Figure 6:
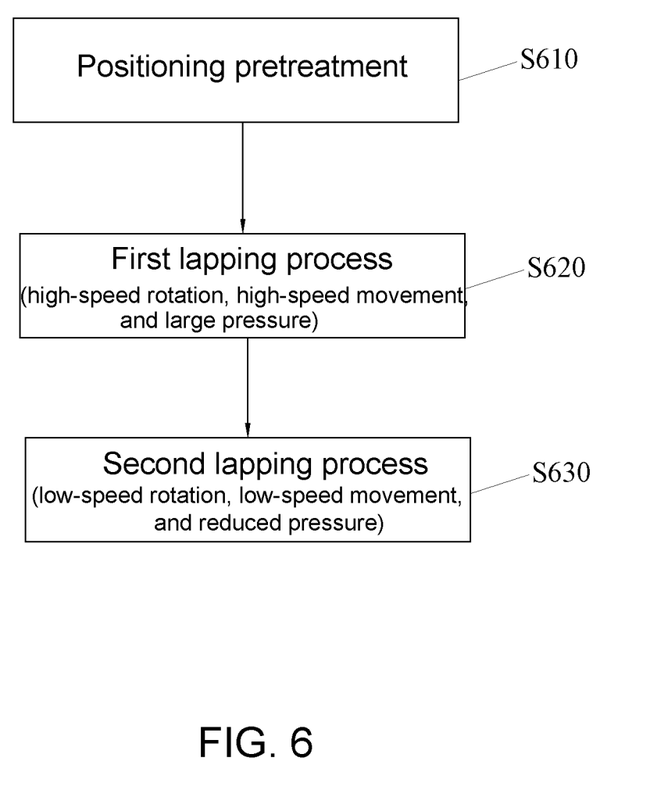
FIG. 6 is a flowchart of a lapping method of a MAMR head slider according to an embodiment of the present invention.

Specifically, referring to FIG. 6, the lapping method of a MAMR head slider includes the following steps.

S610, positioning pretreatment: positioning the row bar at a predetermined position of the lapping plate.

S620, a first lapping process (also called rough lapping): controlling the lapping plate to spin at a predetermined first speed; meanwhile controlling the row bar (that is, the MAMR head slider) to make a reciprocating linear movement at a predetermined first speed within a predetermined range; almost at the same time, controlling the supporting mechanism 55 to apply a predetermined downward force (first force) to the row bar in a direction perpendicular to the surface of the lapping plate. By virtue of the reciprocating movement and the downward force, the predetermined surface (ie, ABS) of the MAMR head slider is in uniform contact with the lapping surface 50A, so that the predetermined end surface is lapped.

Specifically, in the first lapping process, the lapping plate rotates at a high speed, and the range of the first speed is 2.7-1.1 rpm; the reciprocating speed of the MAMR head slider is relatively large, and the range of the first moving speed is 10.0-5.0 mm/s; and the first force received by the MAMR head slider is relatively large, and the range is 1.0-0.8 kgf. Preferably, the rough lapping process includes an initial lapping process section and multiple sub-lapping lapping process sections. During the multiple sub-lapping process sections, the speed of the lapping plate and the reciprocating speed of the MAMR head slider may be successively reduced according to a predetermined removal quantity. The first force in the multiple sub-lapping process sections may be constant. It is understandable that the initial lapping process section is the beginning of the operation of the machine, and the lapping plate is usually started at a low speed and will be adjusted to a predetermined high speed for the next lapping. Similarly, the reciprocating speed of the MAMR head slider is also started at a low speed and will be adjusted to the predetermined high speed for the next lapping. During the initial lapping process section, a first force is not applied to the MAMR head slider, that is, the first force is zero. Preferably, in order to ensure the lapping effect and the lapping efficiency, the lapping process sections in the first lapping process are preferably 3-4.

S630, the second lapping process (also called fine lapping): controlling the lapping plate to spin at a second speed, applying a second force to the MAMR head slider, and controlling the MAMR head slider to move at a second moving speed, so as to lap the predetermined surface. Specifically, the second speed, the second force, and the second moving speed are lower than the first speed, the first force, and the first moving speed in the first lapping process, respectively, and the second force of the final lapping process section is zero.

Specifically, in the second lapping step, the rotation speed of the lapping plate, the reciprocating speed of the MAMR head slider, and the force applied to the MAMR head slider are all significantly reduced compared to the first lapping process, so as to reduce the lapping marks (scratches) generated on the ABS along the lapping direction. It should be noted that in this fine lapping process, in addition to the above parameters, the rotation direction of the lapping plate, the direction of the reciprocating movement of the MAMR head slider and the direction of applied force to the MAMR head slider remain unchanged. Preferably, the second lapping process includes multiple sub-lapping process sections and a final lapping process section. In the multiple sub-lapping process sections, the speed of the lapping plate, the reciprocating speed of the MAMR head slider can be successively reduced according to the predetermined removal quantity, or the reciprocating speed at the last one or last two sub-lapping steps is kept constant; and the predetermined second force applied to the MAMR head slider can be kept constant or decreased successively at the multiple sub-lapping process sections.

Specifically, in order to ensure the optimal lapping effect, the second force applied to the MAMR head slider needs to be removed in the final lapping process section, that is, the second force is zero. The rotation speed of the lapping plate and the reciprocating speed of the MAMR head slider remain the same as in the previous sub-lapping process.

For ensuring the lapping effect and lapping efficiency, the lapping process sections in the first lapping process are preferably 3-4.

Specifically, in the second lapping process, the second speed of the lapping plate is in a range of 0.5-0.2 rpm; the second moving speed of the MAMR head slider is in a range of 0.8-0.25 mm/s; except for the final lapping process section, the second force applied to the MAMR head slider is larger than zero and smaller than 0.6 kgf.

The following table 1 shows a preferable embodiment of the second lapping process including multiple sub-lapping process sections and a final lapping process section, which is not limited however.

TABLE 1

| Section of fine lapping | Rotation speed of lapping plate (second speed) (rpm) | Moving speed of MAMR head slider (second moving speed) (mm/s) | Second force applied to MAMR head slider (kgf) |
| --- | --- | --- | --- |
| 1$^{st}$ | 0.5 | 0.8 | 0.6 |
| 2$^{nd}$ | 0.4 | 0.25 | 0.6 |
| 3$^{rd}$ | 0.2 | 0.25 | 0.6 |
| 4$^{th}$ (final) | 0.2 | 0.25 | 0 |

Figure 7:
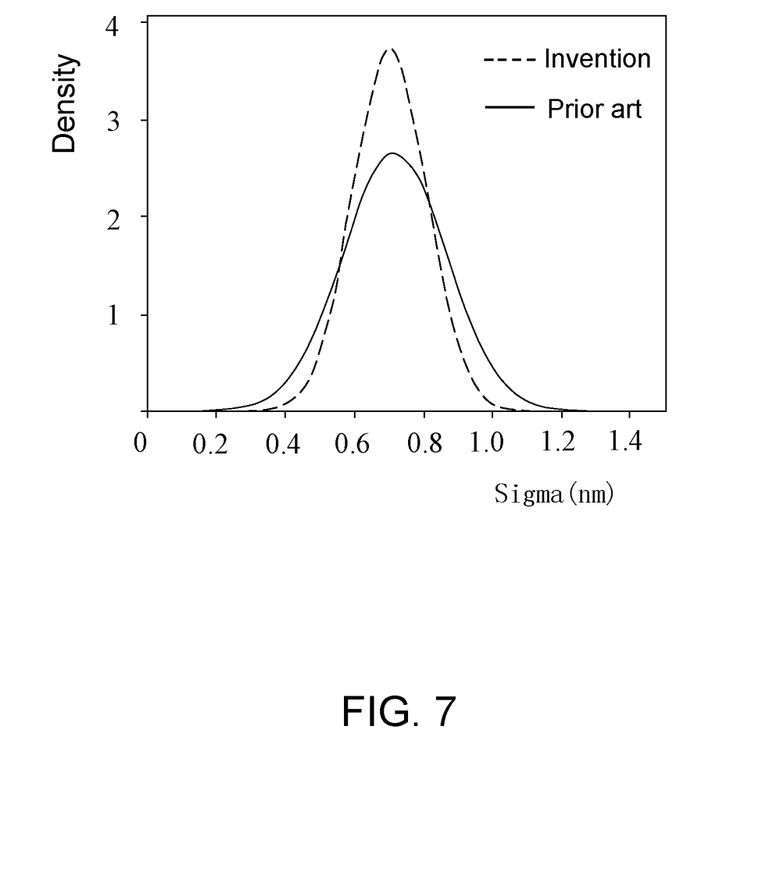
FIG. 7 is a comparison diagram of standard deviation (sigma) control of tail shield of the magnetic pole between the MAMR head according to the present invention and the traditional MAMR head.
Figure 8A:
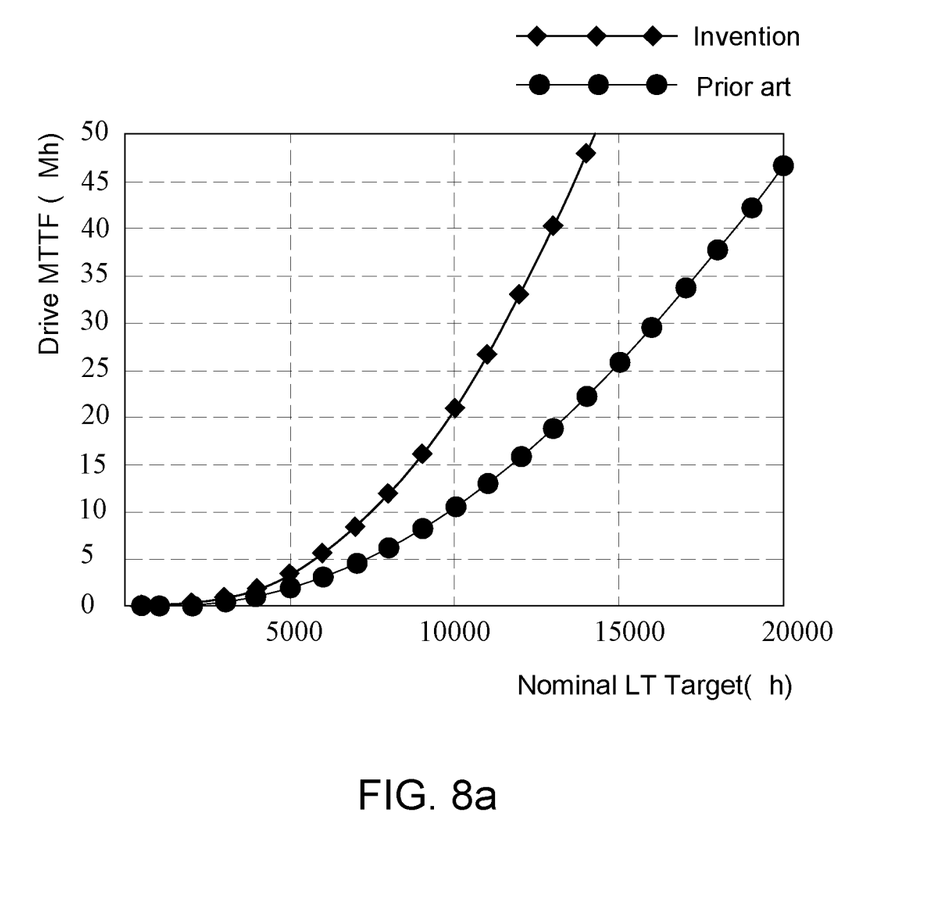
FIGS. 8a-8b are comparison diagrams of the life time between the MAMR head obtained according to the lapping method of the present invention and the conventional MAMR head obtained according to the traditional lapping method.
Figure 8B:
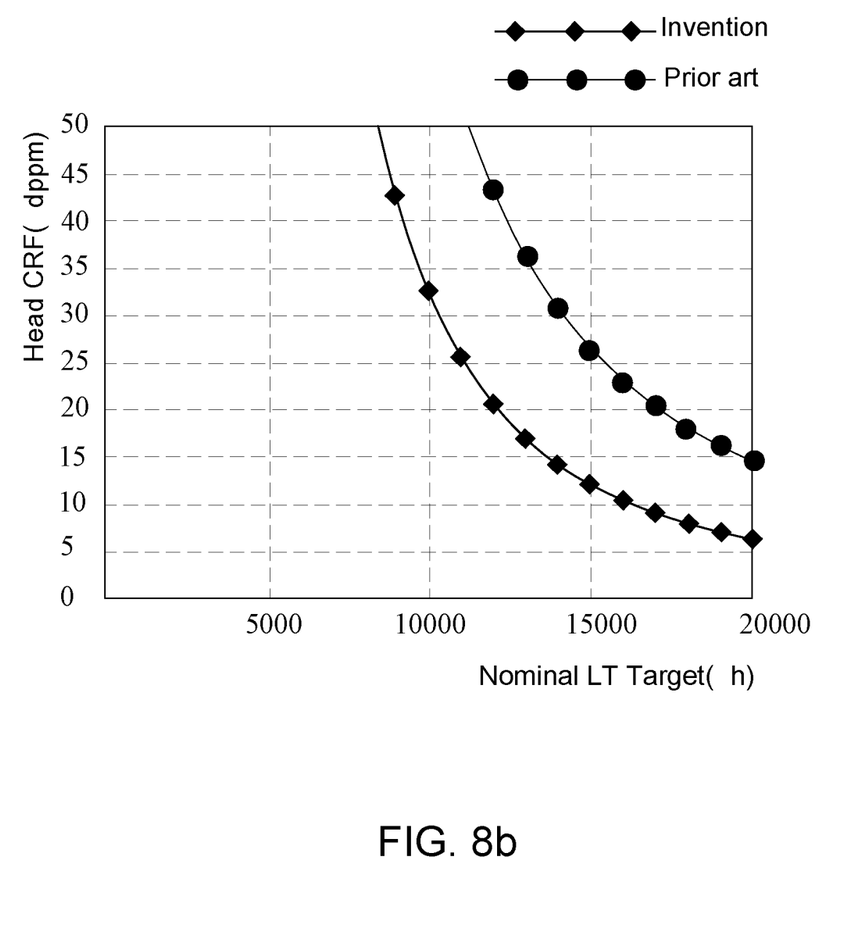

FIG. 7 is a comparison diagram of standard deviation (sigma) control of tail shield of the magnetic pole between the MAMR head according to the present invention and the traditional MAMR head. FIGS. 8a-8b are comparison diagrams of the life time between the MAMR head obtained according to the present invention and the traditional MAMR head. Obviously, the sigma control of tail shield of the magnetic pole in the MAMR head obtained according to the lapping method of the present invention is significantly better than the prior art, and the life time is 1.5 times of the traditional MAMR head.

In addition, the Sigma of the pole tip recession (PTR) of the MAMR head according to the present invention has an improvement of 0.04-0.05 nm compared with the traditional MAMR head, and the magnetic pole roughness has an improvement of about 0.01-0.03 nm.

By this token, the lapping method of the present invention uses multiple lapping processes to optimize the method, and reduces the rotation speed of the lapping plate and the moving speed of the MAMR head slider in the subsequent lapping processes, and removes the pressure on the MAMR head slider in the final lapping process, so as to reduce lapping marks on the ABS, improve the roughness of the surface of magnetic pole or the ABS, thereby improving the pole tip recession, improving the reliability of the MAMR head and extending the life time of the MAMR head accordingly.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A lapping method of a microwave assisted magnetic recording (MAMR) head slider, adapted for polishing a predetermined surface of the MAMR head slider by a lapping plate with a lapping surface to form a MAMR head having a spin torque oscillator (STO) on the predetermined surface, and the lapping method comprising:
- a first lapping process: controlling the lapping plate to spin at a first speed, and controlling the MAMR head slider to move at a first moving speed, and applying a first force to the MAMR head slider so as to polish the predetermined surface; and
- a second lapping process: controlling the lapping plate to spin at a second speed that is lower than the first speed, and controlling the MAMR head slider to move at a second moving speed that is lower than the first moving speed, and applying a second force that is lower than the first force to the MAMR head slider so as to polish the predetermined surface;
- and the second lapping process comprising a final lapping process section, and the second force in the final lapping process being zero.

2. The lapping method according to claim 1, wherein in the second lapping process, the second speed of the lapping plate is in a range of 0.5-0.2 rpm.

3. The lapping method according to claim 1, wherein in the second lapping process except for the final lapping process section, the second force applied to the MAMR head slider is larger than zero and smaller than 0.6 kgf.

4. The lapping method according to claim 1, wherein in the second lapping process, the second moving speed of the MAMR head slider is in a range of 0.8-0.25 mm/s.

5. The lapping method according to claim 1, wherein in the first and second processes, the MAMR head slider is configured to make a reciprocating linear movement along a radial direction of the lapping plate.

6. The lapping method according to claim 1, wherein in the first and second processes, the MAMR head slider is configured to apply the first and the second forces in a direction perpendicular to a surface of the lapping surface.

7. The lapping method according to claim 1, wherein the second lapping process comprises multiple sub-lapping process sections and the final lapping process section, the second speed, the second force and the second moving speed in a latter sub-lapping process section is smaller than or equal to that in a previous sub-lapping process section.

8. A microwave assisted magnetic recording (MAMR) head slider obtained according to the method in claim 1, comprising a leading edge, a trailing end, an air bearing surface facing a medium, and a MAMR head embedded in the trailing end and having a spin torque oscillator (STO), and the air bearing surface having unidirectional lapping marks.

* * * * *